US010931766B2

(12) United States Patent
Ton

(10) Patent No.: US 10,931,766 B2
(45) Date of Patent: Feb. 23, 2021

(54) DATA COLLECTING METHOD, SYSTEM, TERMINAL, AND SERVER

(71) Applicant: Alibaba Group Holding Limited, Grand Cayman (KY)

(72) Inventor: Guojun Ton, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 84 days.

(21) Appl. No.: 15/789,873

(22) Filed: Oct. 20, 2017

(65) Prior Publication Data
US 2018/0048724 A1  Feb. 15, 2018

Related U.S. Application Data

(63) Continuation of application No. PCT/CN2016/079373, filed on Apr. 15, 2016.

(30) Foreign Application Priority Data

Apr. 22, 2015  (CN) .......................... 201510198905.9

(51) Int. Cl.
*G06F 15/16* (2006.01)
*H04L 29/08* (2006.01)
(Continued)

(52) U.S. Cl.
CPC .............. *H04L 67/22* (2013.01); *G06F 16/00* (2019.01); *G06F 16/24* (2019.01); *H04L 67/18* (2013.01);
(Continued)

(58) Field of Classification Search
USPC ....................................................... 709/219
See application file for complete search history.

(56) References Cited

U.S. PATENT DOCUMENTS 7,894,448 B1\* 2/2011 Lillibridge ............. G06Q 30/02
370/389
2014/0344455 A1\* 11/2014 Cheng .................... G06Q 30/02
709/224
2015/0100887 A1\* 4/2015 Verkasalo ............. G06F 3/0482
715/735

FOREIGN PATENT DOCUMENTS

CN  103246661  8/2013
CN  103916293  7/2014

OTHER PUBLICATIONS

Translation of International Search Report from corresponding PCT application No. PCT/CN2016/079373 dated Jul. 19, 2016, 3 pages.
(Continued)

*Primary Examiner* — Alan S Chou
(74) *Attorney, Agent, or Firm* — Lee & Hayes, P.C.

(57) ABSTRACT

A data collecting method at the terminal side includes: calculating layout position structure information; obtaining event tracking transaction data from a first server; generating user behavior data according to the event tracking transaction data and the layout position structure information; and sending the user behavior data to a second server. Compared with the conventional techniques, the terminal of the present disclosure uses the event tracking transaction data and the layout position structure information to generate the user behavior data, instead of simply calling API to obtain the user behavior data, self-defines the event tracking setting, and automatically collects the user behavior data. Thus, the present disclosure realizes automatic event tracking and improve the accuracy of event tracking.

17 Claims, 10 Drawing Sheets

(51) Int. Cl.
*H04W 4/02* (2018.01)
*G06F 16/00* (2019.01)
*G06F 16/24* (2019.01)
G06F 40/106 (2020.01)
H04L 29/06 (2006.01)

(52) U.S. Cl.
CPC ............ *H04W 4/02* (2013.01); *G06F 40/106* (2020.01); *H04L 67/42* (2013.01); *H04L 69/329* (2013.01)

(56) References Cited

OTHER PUBLICATIONS

Translation of Written Opinion from corresponding PCT application No. PCT/CN2016/079373 dated Jul. 19, 2016, 8 pages.
Translation of CN Search Report from Corresponding CN Application No. 201510198905.9 dated Jun. 5, 2017, a foreign counterpart application fo U.S. Appl. No. 15/789,873, 2 pages.
Translation of CN Office Action from Corresponding CN Application No. 201510198905.9 dated Apr. 3, 2018, a foreign counterpart application fo U.S. Appl. No. 15/789,873, 6 pages.
Translation of CN Office Action from Corresponding CN Application No. 201510198905.9 dated Jun. 16, 2017, a foreign counterpart application fo U.S. Appl. No. 15/789,873, 5 pages.

* cited by examiner

DATA COLLECTING METHOD, SYSTEM, TERMINAL, AND SERVER

CROSS REFERENCE TO RELATED PATENT APPLICATIONS

This application claims priority to and is a continuation of PCT Patent Application No. PCT/CN2016/079373, filed on 15 Apr. 2016, which claims priority to Chinese Patent Application No. 201510198905.9, filed on Apr. 22, 2015, entitled "Data Collecting Method, System, Terminal, and Server," which are hereby incorporated by reference in their entirety.

TECHNICAL FIELD

The present disclosure relates to the technology field of computer technology, and, more particularly, to a data collecting method, system, terminal, and server.

BACKGROUND

Currently, mobile basic service providers provide software development kits (SDK) of various platforms (such as Android, IOS, iPad) to the developers of applications (App). Thus, the developers can integrate SDK and call the application program interface (API) of the SDK at the component that needs event tracking to collect user behavior data and provide better data service based on the analysis result of analyzing the user behavior data. Such steps of collecting the user behavior data includes the following steps. The developer of the application integrates the open-source SDK that collects and transmits the user behavior data, calls the API of the SDK to trigger collecting the user behavior data according to the operations of the user of the App at the user interface (UI) and sends the user behavior data to a server for data collecting.

However, the conventional techniques have the following pitfalls. The update package for terminal has a long cycle and the decision whether to update is at the user. If the event tracking location is wrong or missing in the App, there is the problem of low quality of the collected user behavior data and thus the data analysis has no value.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method comprising:
calculating layout position structure information;
obtaining event tracking transaction data from a first server;
generating user behavior data according to the event tracking transaction data and the layout position structure information.

For example, the method further comprises sending the user behavior data to a second server.

For example, the method further comprises generating the event tracking transaction data according to an event tracking setting operation of a user.

For example, wherein the event tracking setting operation is targeted to at least one of the following:
an application;
an application layout;
an application page; and
a page control.

For example, wherein the obtaining the event tracking transaction data from the first server includes:
obtaining the event tracking transaction data from the first server according to the layout position structure information.

For example, the generating the user behavior data according to the event tracking transaction data and the layout position structure information includes:
generating the user behavior data according to the event tracking transaction data, the layout position structure information, and additional information.

For example, the additional information includes at least one of the following:
a device name;
a device model number; and
a resolution.

The present disclosure al so provides a server comprising:
one or more processors; and
one or more memories storing thereon computer-readable instructions that, when executed by the one or more processors, cause the one or more processors to perform acts comprising:
generating event tracking transaction data according to an event tracking setting operation of a user; and
sending the event tracking transaction data to a first terminal to generate user behavior data according to the event tracking transaction data and layout position structure information.

For example, the first terminal generates the user behavior data according to the event tracking transaction data and layout position structure information.

For example, the event tracking setting operation is targeted to at least one of the following:
an application;
an application layout;
an application page; and
a page control.

For example, the sending the event tracking transaction data to the first terminal includes:
receiving the layout position structure information sent by the first terminal; and
sending the event tracking transaction data to the first terminal according to the layout position structure information.

The present disclosure also provides one or more memories storing thereon computer-readable instructions that, when executed by one or more processors, cause the one or more processors to perform acts comprising:
obtaining user behavior data from a second server;
calculating layout position structure information; and
calculating a hash value according to the layout position structure information.

For example, the acts further comprise:
presenting a user behavior according to a corresponding correlation relationship between the user behavior data and the hash value.

For example, a first terminal generates the user behavior data according to event tracking transaction data and layout position structure information, and sends the user behavior data to the second server.

For example, the event tracking transaction data is generated according to an event tracking setting operation of a user.

For example, the event tracking setting operation is targeted to at least one of the following:
an application;
an application layout;
an application page; and
a page control.

For example, the obtaining the user behavior data from the second server includes:
before a cycle of a loaded application page ends, requesting a user behavior log from the second server to obtain the user behavior data.

For example, the calculating the layout position structure information includes:
traversing all of page controls of an application page; and
calculating the layout position structure information of each page control.

For example, the calculating the hash value according to the layout position structure information includes:
obtaining a path structure of a page control according to the layout position structure information of the page control.

For example, the calculating the hash value according to the layout position structure information further includes:
calculating the hash value according to the path structure.

BRIEF DESCRIPTION OF THE DRAWINGS

The features, purposes, and advantages of the present disclosure become more apparent in view of the description of the non-restrictive example embodiments as shown in the FIGS.

Figure 1:
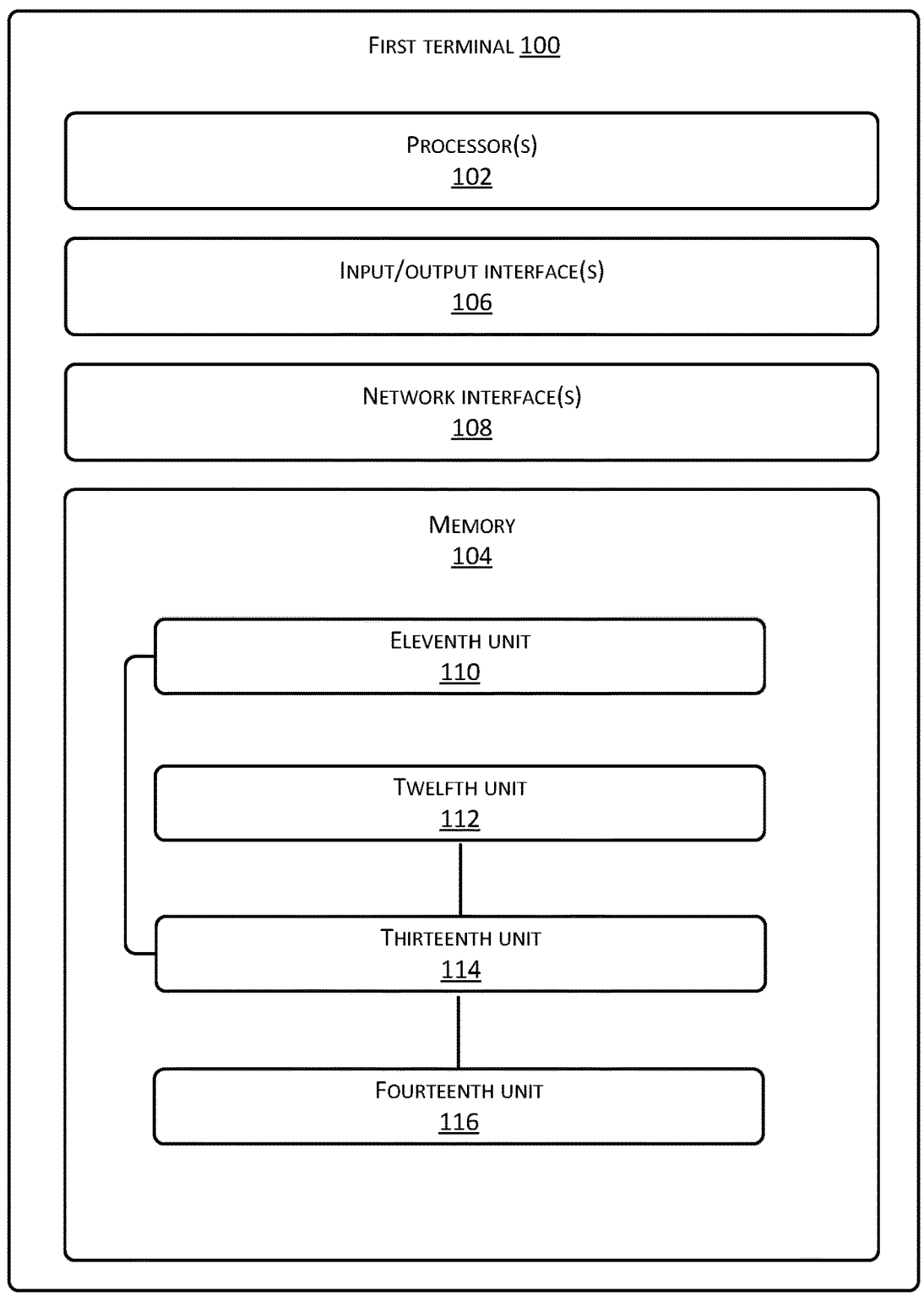
FIG. 1 is a schematic diagram illustrating a first terminal for collecting data according to an aspect of the present disclosure.

The same or similar labels in the FIGS. refer to the same or similar components.

DETAILED DESCRIPTION

In conjunction with the following of the present disclosure, the technical solutions of the present disclosure will be described. Apparently, the described example embodiments merely represent some of the example embodiments of the present disclosure and are not to be construed as limiting the present disclosure. All other example embodiments obtained by those of ordinary skill in the art based on the example embodiments of the present disclosure fall within the scope of protection of the present disclosure.

In a standard configuration of the present disclosure, the terminal, the device and trusted party in the network include one or more central processing units (CPUs), input/output interface(s), network interface(s), and memory. The memory may include nonpermanent memory, random access memory (RAM) and/or nonvolatile memory, such as read-only memory (ROM) or flash memory, in computer-readable media. Memory is an example of a computer-readable medium. The memory is an example of computer readable media.

The computer readable media include non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition herein, the computer readable media do not include transitory media, such as modulated data signals and carriers.

The present disclosure provides a data collecting method, system, terminal, and server.

According to an aspect of the present disclosure, the present disclosure provides a data collecting method applied at a client terminal, which includes:
calculating layout position structure information;
obtaining event tracking transaction data from a first server;
generating user behavior data according to the event tracking transaction data and the layout position structure information; and
sending the user behavior data to the second server.

According to another aspect of the present disclosure, the present disclosure provides a data collection method applied at a server, which includes:
generating event tracking transaction data according to an event tracking setting operation of a user; and
sending the event tracking transaction data to a first terminal so that the first terminal generates user behavior data according to the event tracking transaction data and layout position structure information.

According to another aspect of the present disclosure, the present disclosure also provides a data collecting method applied at a server, which includes:

receiving user behavior data sent by a first terminal, wherein the first terminal calculates layout position structure information, obtains event tracking transaction data from a first server, and generates the user behavior data according to the event tracking transaction data and the layout position structure information.

According to another aspect of the present disclosure, the present disclosure also provides a data collecting method applied at a terminal, which includes:

receiving user behavior data sent by a second server, wherein a first terminal generates the user behavior data according to event tracking transaction data and layout position structure information, and sends the user behavior data to the second server;

calculating layout position structure information;

calculating a hash value according to the layout position structure information; and presenting according to a corresponding correlation relationship between the user behavior data and the hash value.

According to an aspect of the present disclosure, the present disclosure provides a data collecting terminal, which includes:

an eleventh unit that calculates layout position structure information;

a twelfth unit that obtains event tracking transaction data from a first server;

a thirteenth unit that generates user behavior data according to the event tracking transaction data and the layout position structure information; and a fourteenth unit that sends the user behavior data to the second server.

According to another aspect of the present disclosure, the present disclosure provides a data collection server, which includes:

a twenty-first unit that generates event tracking transaction data according to an event tracking setting operation of a user; and a twenty-second unit that sends the event tracking transaction data to a first terminal so that the first terminal generates user behavior data according to the event tracking transaction data and layout position structure information.

According to another aspect of the present disclosure, the present disclosure also provides a data collecting server, which includes:

a thirty-first unit that receives user behavior data sent by a first terminal, wherein the first terminal calculates layout position structure information, obtains event tracking transaction data from a first server, and generates the user behavior data according to the event tracking transaction data and the layout position structure information.

According to another aspect of the present disclosure, the present disclosure also provides a data collecting terminal, which includes:

a forty-first unit that receives user behavior data sent by a second server, wherein a first terminal generates the user behavior data according to event tracking transaction data and layout position structure information, and sends the user behavior data to the second server;

a forty-second unit that calculates layout position structure information;

a forty-third unit that calculates a hash value according to the layout position structure information; and a forty-fourth unit that presents according to a corresponding correlation relationship between the user behavior data and the hash value.

The present disclosure provides a data collecting system that includes a terminal and a server of the present disclosure.

Compared with the conventional techniques, the techniques of the present disclosure generate the user behavior data according to the event tracking transaction data and the layout position structure information instead of simply calling the user behavior data through the API, self define the event tracking location, and automatically collect the user behavior data. Thus, the techniques of the present disclosure implement automatic event tracking, improve an accuracy of the event tracking. In addition, the present disclosure also reduces the event tracking cycle and transaction development and improves development efficiency.

FIG. 1 is a schematic diagram illustrating a first terminal 100 for collecting data according to an aspect of the present disclosure. The first terminal 100 for collecting data includes one or more processor(s) 102 or data processing unit(s) and memory 104. The first terminal 100 may further include one or more input/output interface(s) 106 and one or more network interface(s) 108. The memory 104 is an example of computer readable media.

The memory 104 may store therein a plurality of modules or units including an eleventh unit 110, a twelfth unit 112, a thirteenth unit 114, and a fourteenth unit 116.

The eleventh unit 110 calculates layout position structure information. The twelfth unit obtains event tracking transaction data from a first server; the thirteenth unit generates user behavior data according to the event tracking transaction data and the layout position structure information; and the fourteenth unit sending the user behavior data to the second server.

The first terminal 100 is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to a second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data. The layout position structure information is a path structure of a page component such as xPath in XML, path language. For example, an example path of Android system is /TestActivity/FrameLayout/linearLayout/ linearLayout/Button/id-buybutton. The user behavior data includes terminal information and detailed event tracking transaction data. The detailed event tracking transaction data may include hash value calculated based on the path structure and a quantity of times that the component corresponding to path structure is clicked by a user.

For example, the user behavior data at a webpage is {page:{789919041201,"pageName=indexPage"}, ctrls: {{1883888493,"ctrlName=orderButton"} . . . }, wherein, pageName=indexPage and ctrlName=orderButton represent the page name corresponding to page and the control name corresponding to ctrls respectively. In addition, more data may be preset or configured. The administrator of the transaction party may self define the event tracking transaction data according to actual transaction needs.

For example, after the twelfth unit 112 obtains the event tracking transaction data from the first server, the first terminal 100 collects the user behavior data based on the event tracking location set by the administrator at the event tracking management system. When the user clicks a control of an App, the eleventh unit 110, according to the event tracking transaction data, calls the API of SDK to calculate the layout position structure information of the page corresponding to the control. When the layout position structure information is calculated, the control's upper level control is calculated based on the control, then the next upper level control is calculated based on the upper level control, and so forth, until the root control of the Android system to obtain the complete layout structure position information. The calculation of the layout position structure information may be implemented through directly calling the current API of the Android system. The thirteenth unit 114 generates the user behavior data based on the event tracking transaction data and the layout position structure information to collect the operations of the user on the first terminal. Then the fourteenth unit 116 sends the user behavior data to the second server.

For example, the event tracking transaction data is generated based on the event tracking setting operation of the user. The event tracking setting operation may be targeted to at least one of the following: an application, an application layout, an application page, and a page control.

For example, the event tracking transaction data is generated according to the event tracking setting operation of the administrator under the event tracking management system of the first server. The format of the event tracking transaction data is key-value data pair in json format. The setting of the event tracking via the network administrator controls the event tracking and avoids collecting too large quantity of data. The network administrator may use the application, the application layout, the application page, the page control as the dimension in the event tracking management system to set various levels of event tracking. The event tracking setting timing may be at the development stage, testing stage, or when the App is officially published to couple with the development of the App. The event tracking setting operation may be a registration or management operation at the application, the application layout, the application page, and the page control, such as adding, deleting, modifying, and searching operation. The event tracking transaction data may be set at the cache of the first server. When the first terminal needs the event tracking transaction data, the eleventh unit 110 obtains the event tracking transaction data from the cache of the first server, which reduces the calculation pressure that the App directly visits the event tracking managing system at the back end by saving to the cache.

For example, the twelfth unit 112 obtains the event tracking transaction data from the first server according to the layout position structure information. When the user clicks the control, the eleventh unit 110 automatically calculate the hash value of the path structure to the component, and obtains the corresponding event transaction tracking data from the first server according to the hash value in json format.

For example, the thirteenth unit 114 generates the user behavior data according to the event tracking transaction data, the layout position structure information, and additional information. The additional information includes at least one of the following: a device name, a device model number, and a resolution. The additional information may be obtained by calling the API of the operation system of the terminal. The first terminal collects the additional information and adds such information into the user behavior data through the thirteenth unit 114, which improves the completeness of the user behavior data.

Figure 2:
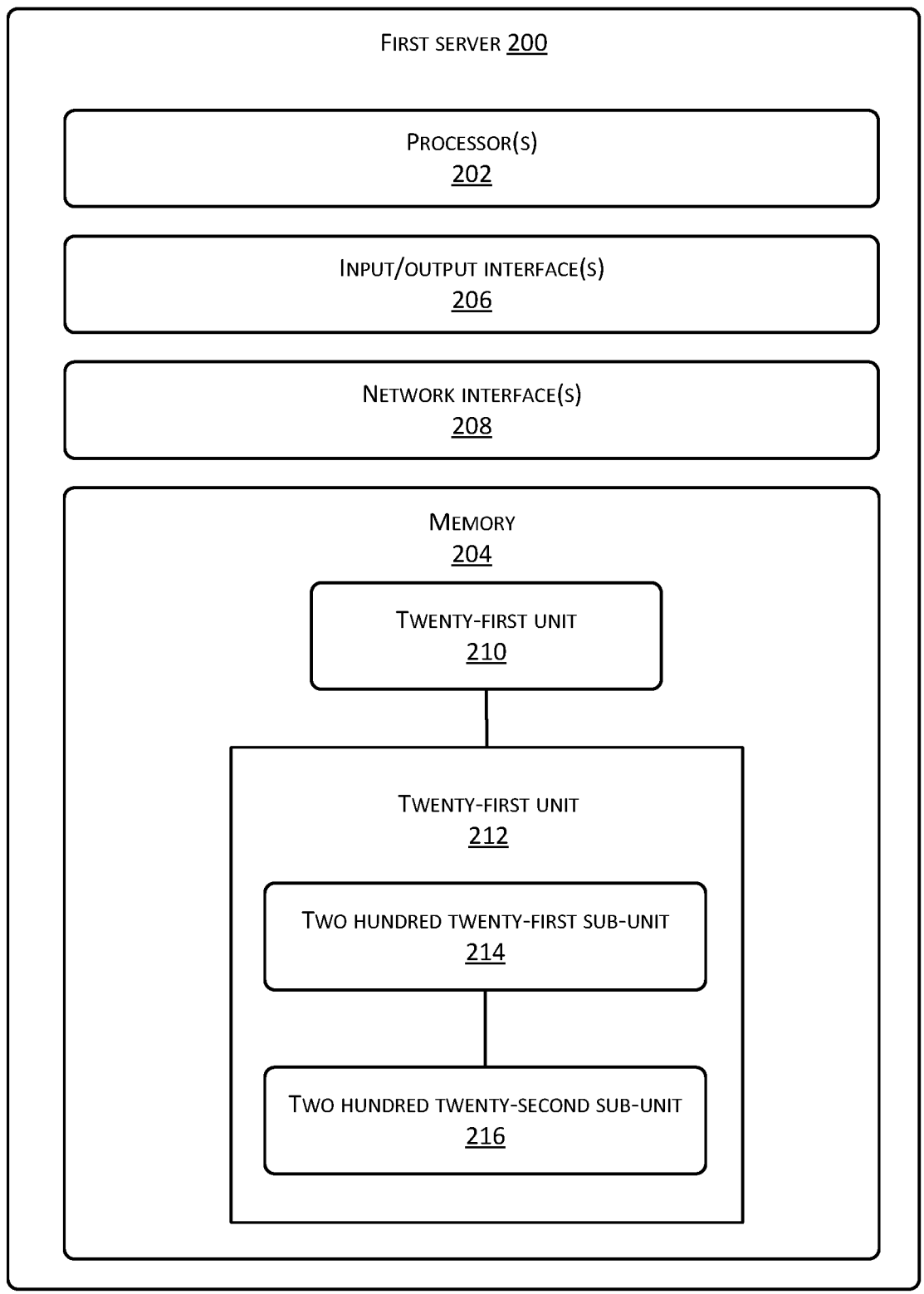
FIG. 2 is a schematic diagram illustrating a first server for collecting data according to an aspect of the present disclosure.

FIG. 2 is a schematic diagram illustrating a first server for collecting data according to an aspect of the present disclosure. The first server 200 for collecting data includes one or more processor(s) 202 or data processing unit(s) and memory 204. The first server 200 may further include one or more input/output interface(s) 206 and one or more network interface(s) 208. The memory 204 is an example of computer readable media.

The memory 204 may store therein a plurality of modules or units including a twenty-first unit 210 and a twenty-second unit 212.

The twenty-first unit 210 generates event tracking transaction data according to an event tracking setting operation of a user. The twenty-second unit 212 sends the event tracking transaction data to the first terminal so that the first terminal generates user behavior data according to the event tracking transaction data and layout position structure information.

The first terminal 100 is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to the second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server 200 includes an event tracking management system. The first terminal obtains the event tracking transaction data from the first server 200 to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data.

For example, the administrator uses the twenty-first unit 210 to conduct event tracking setting operation and generate the event tracking transaction data. The twenty-second unit 212 sends the event tracking transaction data to the first terminal. The first terminal calculates the layout position structure information, and then generates the user behavior data according to the event tracking transaction data and the layout position structure information and sends the user behavior data to the second server.

For example, the event tracking setting operation may be targeted to at least one of the following: an application, an application layout, an application page, and a page control.

For example, the event tracking transaction data is generated according to the event tracking setting operation of the administrator under the event tracking management system of the first server 200. The format of the event tracking transaction data is key-value data pair in json format. The setting of the event tracking via the network administrator controls the event tracking and avoids collecting too large quantity of data. The network administrator may use the application, the application layout, the application page, the page control as the dimension in the event tracking management system to set various levels of event tracking. The event tracking setting timing may be at the development stage, testing stage, or when the App is officially published to couple with the development of the App. The event tracking setting operation may be a registration or management operation at the application, the application layout, the application page, and the page control, such as adding, deleting, modifying, and searching operation. The event tracking transaction data may be set at the cache of the first server. The first terminal obtains the event tracking transaction data from the cache of the first server. It reduces the calculation pressure that the App directly visits the event tracking managing system at the back end by saving to the cache.

For example, the twenty-second unit 212 may include a two hundred twenty-first sub-unit 214 and a two hundred twenty-second sub-unit 216. The two hundred twenty-first sub-unit 214 receives the layout position structure information sent by the first terminal. The two hundred twenty-second sub-unit 216 sends the event tracking transaction data to the first terminal according to the layout position structure information.

When the user clicks the control, the first terminal automatically calculates the layout position structure information of the control. The two hundred twenty-first sub-unit 214 receives the layout position structure information sent by the first terminal. Then the two hundred twenty-second sub-unit 216 matches according to the layout position structure information received by the two hundred twenty-first sub-unit 214. For example, through the matching from the hash value of the layout position structure information to the event tracking transaction data in json format, the corresponding event tracking transaction data is obtained and sent to the first terminal.

Figure 3:
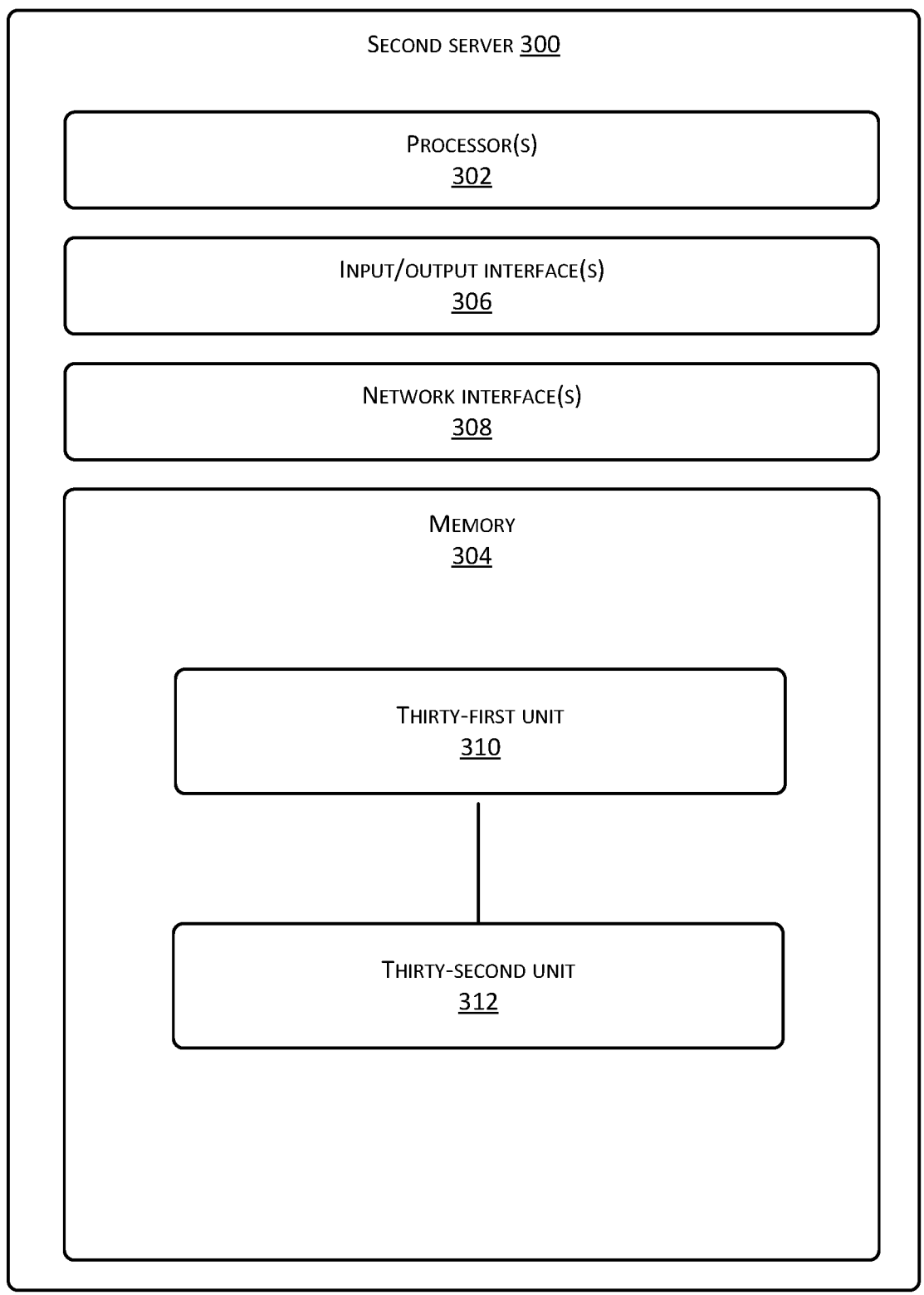
FIG. 3 is a schematic diagram illustrating a second server for collecting data according to an aspect of the present disclosure.

FIG. 3 is a schematic diagram illustrating a second server for collecting data according to an aspect of the present disclosure. The second server 300 for collecting data includes one or more processor(s) 302 or data processing unit(s) and memory 304. The second server 300 may further include one or more input/output interface(s) 306 and one or more network interface(s) 308. The memory 304 is an example of computer readable media.

The memory 304 may store therein a plurality of modules or units including a thirty-first unit 310.

The thirty-first unit 310 receives user behavior data sent by the first terminal.

For example, the second server 300 may further include a thirty-second unit 312 that sends the user behavior data to the second terminal so that the second terminal presents according to a corresponding correlation relationship between the user behavior data and the hash value.

The first terminal is the terminal for collecting the user behavior data, i.e., the source of the user behavior data. After collecting the user behavior data, the first terminal sends the user behavior data to the second server. The second server is a cloud server that stores the collected user behavior data into the cloud for further statistics and analysis based on the user behavior data. For example, the second server sends the user behavior data to the second terminal so that the second terminal presents according to the corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server 200 to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data.

For example, the first terminal calculates the layout position structure information. The first terminal obtains the event tracking transaction data from the first server. The first terminal generates the user behavior data according to the event tracking transaction data and the layout position structure information. The first terminal sends the user behavior data to the thirty-first unit 310. When the second terminal requests the user behavior data, the thirty-second unit 312 sends the user behavior data to the second terminal. The second terminal calculates to obtain the layout position structure information and calculates to obtain the hash value according to the layout position structure information. The second terminal presents the user behavior according to the corresponding correlation relationship between the user behavior data and the hash value.

Figure 4:
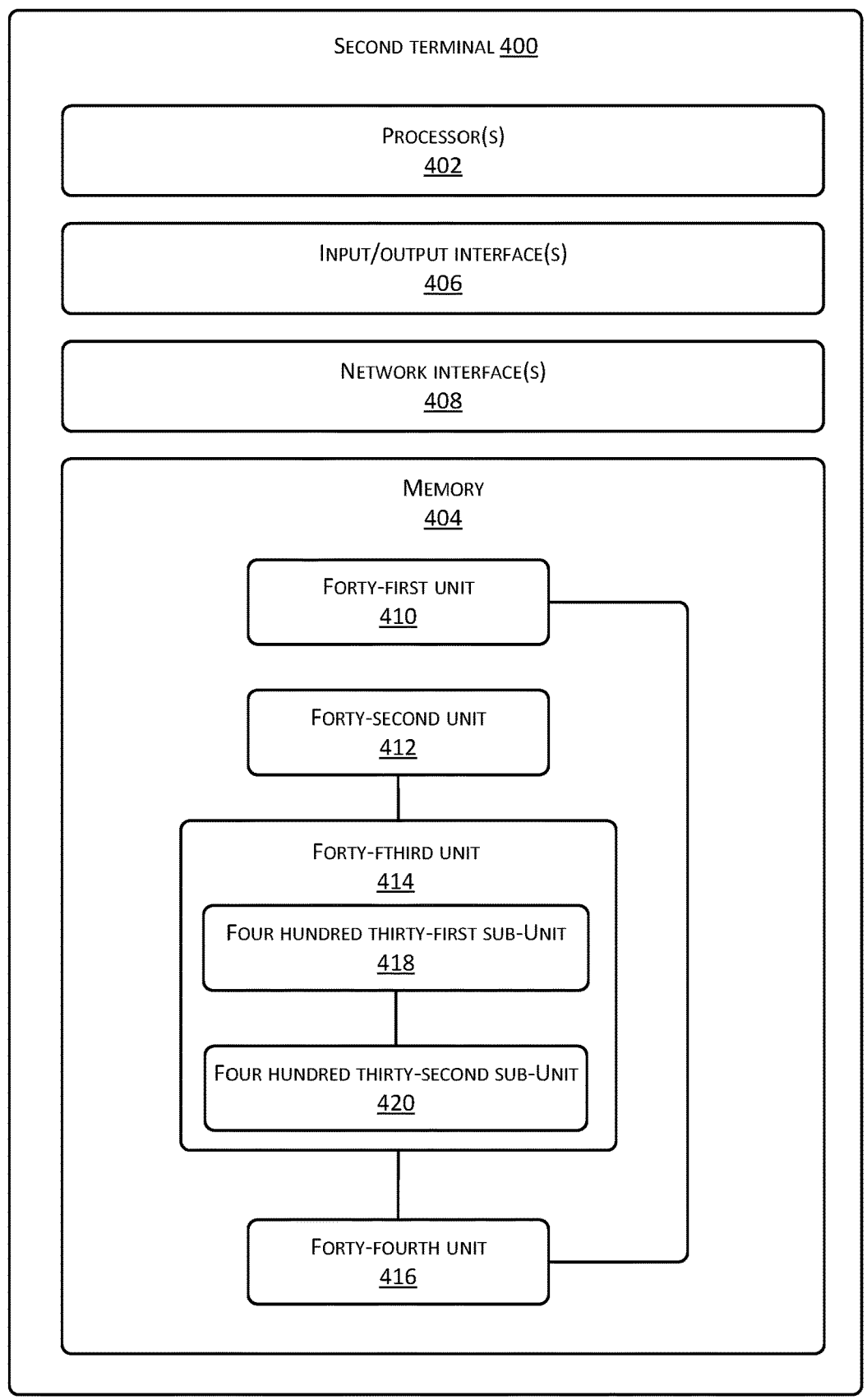
FIG. 4 is a schematic diagram illustrating a second terminal for collecting data according to an aspect of the present disclosure.

FIG. 4 is a schematic diagram illustrating a second terminal for collecting data according to an aspect of the present disclosure. The second terminal 400 for collecting data includes one or more processor(s) 402 or data processing unit(s) and memory 404. The second terminal 400 may further include one or more input/output interface(s) 406 and one or more network interface(s) 408. The memory 404 is an example of computer readable media.

The memory 404 may store therein a plurality of modules or units including a forty-first unit 410, a forty-second unit 412, a forty-third unit 414, and a forty-fourth unit 416.

The forty-first unit 410 obtains the user behavior data from the second server. The first terminal generates the user behavior data according to the event tracking transaction data and layout position structure information. The first terminal sends the user behavior data to the second server. The forty-second unit 412 calculates the layout structure position information. The forty-third unit 414 calculates the hash value according to the layout structure position information. The forty-fourth unit 416 presents according to the corresponding correlation relationship between the user behavior data and the hash value.

The first terminal is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to a second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data. The layout position structure information is a path structure of a page component such as xPath in XML path language. For example, an example path of Android system is /TestActivity/FrameLayout/linearLayout/ linearLayout/Button/id-buybutton. The user behavior data includes terminal information and detailed event tracking transaction data. The detailed event tracking transaction data may include hash value calculated based on the path structure and a quantity of times that the component corresponding to path structure is clicked by a user.

For example, the user behavior data at a webpage is {page:{789919041201,"pageName=indexPage"}, ctrls:{{1883888493,"ctrlName=orderButton"} . . . }, wherein, pageName=indexPage and ctrlName=orderButton represent the page name corresponding to page and the control name corresponding to ctrls respectively. In addition, more data may be preset or configured. The administrator of the transaction party may self-define the event tracking transaction data according to actual transaction needs.

For example, the first terminal calculates the layout position structure information. The first terminal obtains the event tracking transaction data from the first server. The first terminal generates the user behavior data according to the event tracking transaction data and the layout position structure information. The first terminal sends the user behavior data to the second server. When the second terminal 400 requests the user behavior data, the second server sends the user behavior data to the forty-first unit 410. The forty-second unit 412 calculates the layout position structure information. The forty-third unit 414 calculates the hash value according to the layout position structure information. The forty-fourth unit 416 presents the user behavior according to the corresponding correlation relationship between the user behavior data and the hash value.

For example, the forty-first unit 410, before the cycle of the loaded application page ends, requests the user behavior log from the second server to obtain the user behavior data. The forty-second unit 412 traverses all of the page controls of the application page, and calculates the layout position structure information of each page control. The forty-third unit 414 includes a four hundred thirty-first sub-unit 418 and a four hundred thirty-second sub-unit 420. The four hundred thirty-first sub-unit 418 obtains the path structure of the page control according to the layout position structure information of the page control. The four hundred thirty-second sub-unit 420 calculates the hash value according the path structure.

For example, the second terminal switches to data visualization mode through SDK. Under the data visualization mode, the second terminal, in addition to displaying normal App function, displays a quantity of times that the control is clicked in one day through a user interface (UI) control. After the forty-first unit 410 obtains the user behavior data, the forty-second unit 412 calculates the layout position structure information of the page of the first terminal. The forty-third unit 414 calculates the hash value according to the layout position structure information. The forty-fourth unit 416 calls the drawing API of Android for presentation according to the corresponding correlation relationship between the user behavior data and the hash value.

Under the conventional techniques, the server for collecting, after collecting the user behavior data, through the back-end statistics and analysis, presents in the form of table or visual form. However, it is intuitive to present the user behavior data in the form of table. After the second server collects the user behavior data of the first terminal, the second terminal requests the user behavior data of the first terminal stored at the second server, and presents the user behavior of the first terminal at the second terminal, which is more intuitive compared with the chart or table under the conventional techniques.

Figure 5:
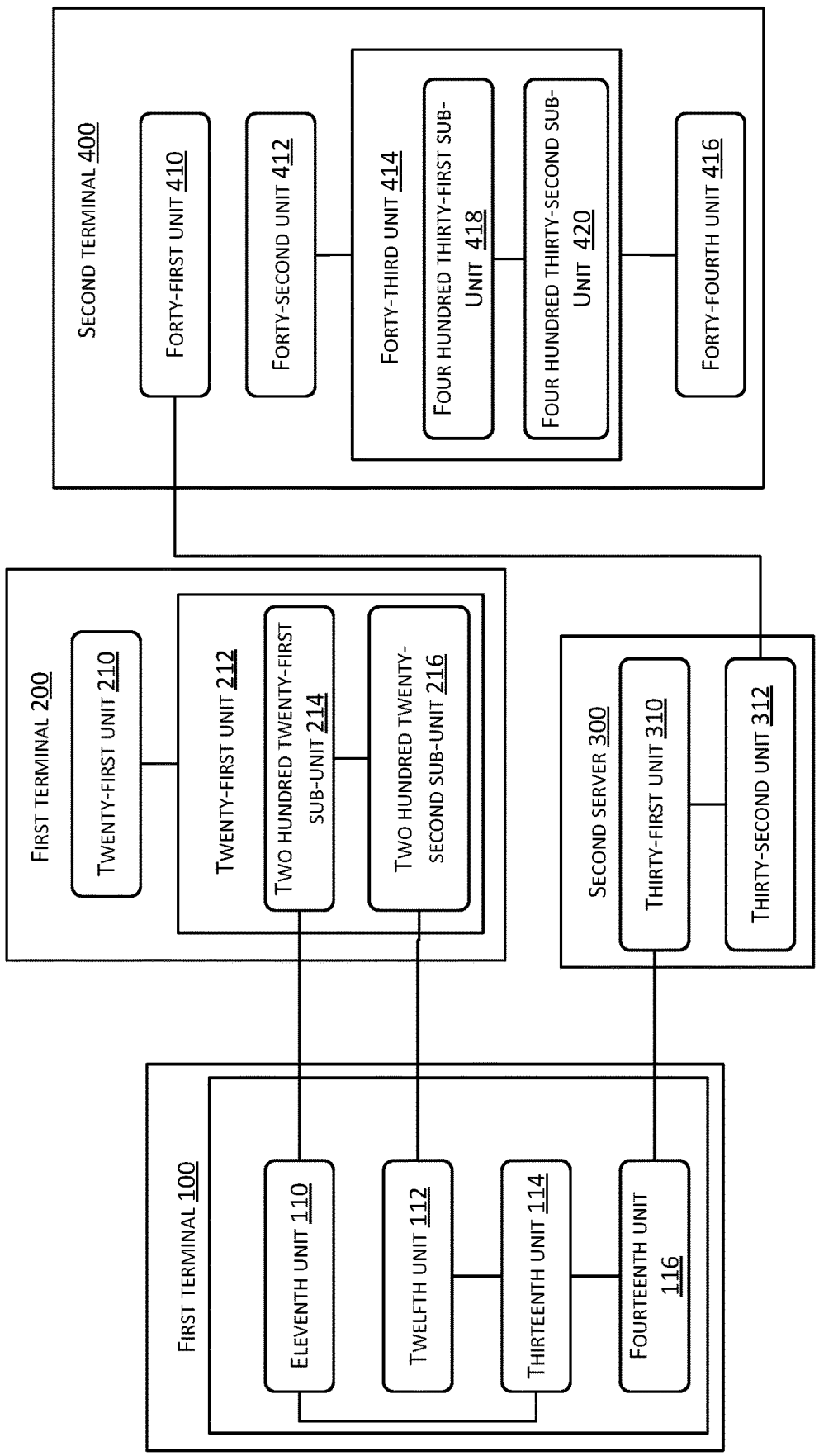
FIG. 5 is a schematic diagram illustrating a system for collecting data according to an aspect of the present disclosure.

FIG. 5 is a schematic diagram illustrating a system for collecting data according to an aspect of the present disclosure. The system for collecting data includes the first terminal 100 as shown in FIG. 1, the first server 200 as shown in FIG. 2, the second server 300 as shown in FIG. 3, and the second terminal 400 as shown in FIG. 4. For the brevity, the processor, memory, input/output interfaces, and network interfaces in the first terminal 100, the first server 200, the second server 300, and the second terminal 400 are omitted in FIG. 5.

The first terminal 100 includes the eleventh unit 110, the twelfth unit 112, the thirteenth unit 114, and the fourteenth unit 116. The first server 200 for collecting data includes a twenty-first unit 210 and a twenty-second unit 212. The second server 300 for collecting data includes a thirty-first unit 310.

The twenty-first unit 210 generates the event tracking transaction data according to the event tracking setting operation of the user. The event tracking setting operation may be targeted to at least one of the following: an application, an application layout, an application page, and a page control. The twenty-second unit 212 stores the event tracking transaction data of the twenty-first unit 210 into the cache so that the twelfth unit 112 obtains the event tracking transaction data. The cache is located on the side of the first server 200 to reduce the calculation pressure of the first terminal 100. The eleventh unit 110 calculates the layout position structure information. The twelfth unit 112 obtains the event tracking transaction data from the twenty-second unit 212. The thirteenth unit 114 generates the user behavior data according to the event tracking transaction data of the twelfth unit 112 and the layout position structure information of the eleventh unit 110. The fourteenth unit 116 sends the user behavior data of the thirteenth unit 114 to the thirty-first unit 310. The thirty-first unit 310 is located at the cloud server, and stores the collected user behavior data at the cloud for further statistics and analysis based on the user behavior data. The event tracking transaction data and the user behavior data are located at different devices, such as the first server 200 and the second server 300 respectively, which reduces the calculation pressure arising from large volume of calculation due to single server.

For example, the twenty-second unit also includes the two hundred twenty-first sub-unit 214 and the two hundred twenty-second sub-unit 216. The two hundred twenty-first sub-unit 214 receives the layout position structure information sent by the eleventh unit 110. The two hundred twenty-second sub-unit 22 sends the event tracking transaction data to the twelfth unit 112 according to the layout position structure information.

For example, the thirteenth unit 114 may generate the user behavior data according to the event tracking transaction data, the layout position structure information, and the additional information. The additional information includes at least one of the following: a device name, a device model number, and a resolution.

For example, the system for collecting data may also include the second terminal as shown in FIG. 4.

The second terminal 400 includes the forty-first unit 410, the forty-second unit 412, the forty-third unit 414, and the forty-fourth unit 416. The second server 300 also includes the thirty-second unit 312.

The forty-first unit 410 obtains the user behavior data from the thirty-second unit 312. The forty-second unit 412 calculates the layout position structure information. The forth-third unit 43 calculates the hash value according to the layout position structure information of the forty-second 42. The forty-fourth unit 416 presents according to a corresponding correlation relationship between the user behavior data of the forty-first unit 410 and the hash value of the forty-third unit 414.

For example, the forty-third unit 414 includes the four hundred thirty-first sub-unit 418 and the four hundred thirty-second sub-unit 420. The four hundred thirty-first sub-unit 418 obtains the path structure of the page control according to the layout position structure information of the page control. The four hundred thirty-second sub-unit 420 calculates the hash value according the path structure provided by the four hundred thirty-first unit.

Figure 6:
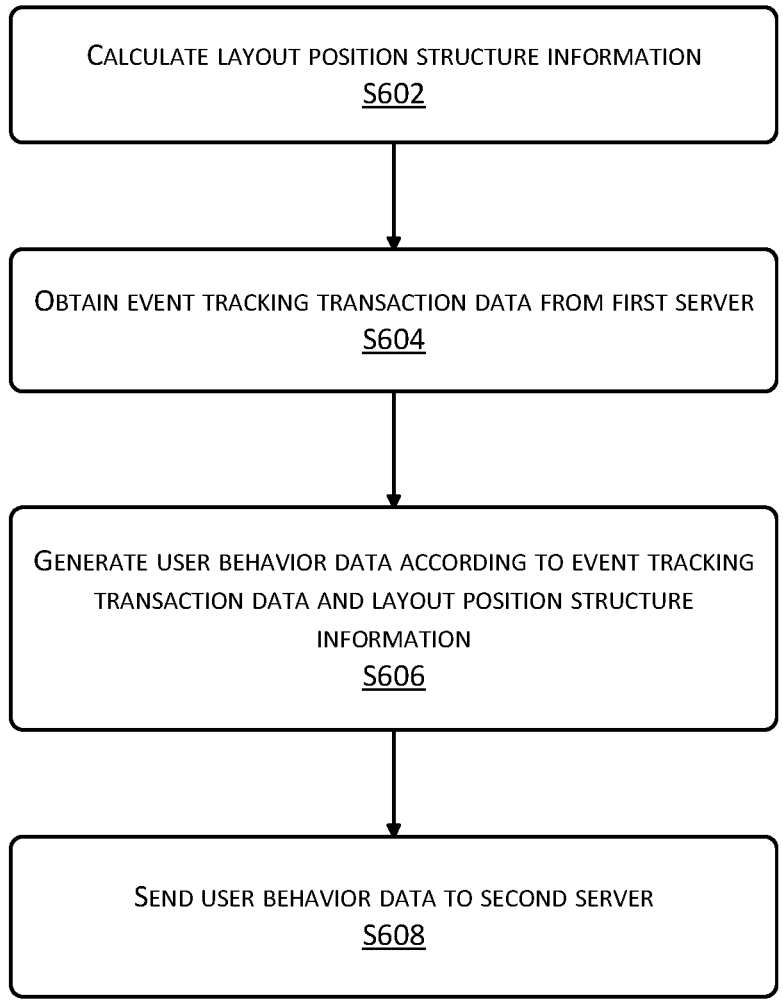
FIG. 6 is a flowchart illustrating a method for collecting data at a first terminal according to an aspect of the present disclosure.

FIG. 6 is a flowchart illustrating a method for collecting data at a first terminal according to an aspect of the present disclosure. The method for collecting data at the first terminal includes:

S602, the layout position structure information is calculated.

S604, the event tracking transaction data is obtained from the first server.

S606, the user behavior data is generated according to the event tracking transaction data and the layout position structure information.

S608, the user behavior data is sent to the second server.

The first terminal is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to a second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data. The layout position structure information is a path structure of a page component such as xPath in XML path language. For example, an example path of Android system is /TestActivity/FrameLayout/linearLayout/ linearLayout/Button/ id-buybutton. The user behavior data includes terminal information and detailed event tracking transaction data. The detailed event tracking transaction data may include hash value calculated based on the path structure and a quantity of times that the component corresponding to path structure is clicked by a user.

For example, the user behavior data at a webpage is {page:{789919041201,"pageName=indexPage"}, ctrls: {{1883888493,"ctrlName=orderButton"} . . . }, wherein, pageName=indexPage and ctrlName=orderButton represent the page name corresponding to page and the control name corresponding to ctrls respectively. In addition, more data may be preset or configured. The administrator of the transaction party may self-define the event tracking transaction data according to actual transaction needs.

For example, after the first terminal obtains the event tracking transaction data from the first server, the first terminal collects the user behavior data based on the event tracking location set by the administrator at the event tracking management system. When the user clicks a control of an App, the eleventh unit 110, according to the event tracking transaction data, calls the API of SDK to calculate the layout position structure information of the page corresponding to the control. When the layout position structure information is calculated, the control's upper level control is calculated based on the control, then the next upper level control is calculated based on the upper level control, and so forth, until the root control of the Android system to obtain the complete layout structure position information. The calculation of the layout position structure information may be implemented through directly calling the current API of the Android system. The first terminal generates the user behavior data based on the event tracking transaction data and the layout position structure information to collect the operations of the user on the first terminal. Then the first terminal sends the user behavior data to the second server.

For example, the event tracking transaction data is generated based on the event tracking setting operation of the user. The event tracking setting operation may be targeted to at least one of the following: an application, an application layout, an application page, and a page control.

For example, the event tracking transaction data is generated according to the event tracking setting operation of the administrator under the event tracking management system of the first server. The format of the event tracking transaction data is key-value data pair in json format. The setting of the event tracking via the network administrator controls the event tracking and avoids collecting too large quantity of data. The network administrator may use the application, the application layout, the application page, the page control as the dimension in the event tracking management system to set various levels of event tracking. The event tracking setting timing may be at the development stage, testing stage, or when the App is officially published to couple with the development of the App. The event tracking setting operation may be a registration or management operation at the application, the application layout, the application page, and the page control, such as adding, deleting, modifying, and searching operation. The event tracking transaction data may be set at the cache of the first server. The first terminal obtains the event tracking transaction data from the cache of the first server, which reduces the calculation pressure that the App directly visits the event tracking managing system at the back end by saving to the cache.

For example, at 604, the event tracking transaction data is obtained from the first server, which includes:

The event tracking transaction data is obtained from the first server according to the layout position structure information. When the user clicks the control, the first terminal automatically calculates the hash value of the path structure to the control, converts the hash value to the data in json format to search for the corresponding event tracking transaction data from the first server.

For example, at 606, the user behavior data is generated according to the event tracking transaction data and the layout position structure information, which includes:

The user behavior data is generated according to the event tracking transaction data, the layout, position structure information, and additional information. The additional information includes at least one of the following: a device name, a device model number, and a resolution. The additional information may be obtained by calling the API of the operation system of the terminal. The first terminal collects the additional information and adds such information into the user behavior data through the thirteenth unit 114, which improves the completeness of the user behavior data.

Figure 7:
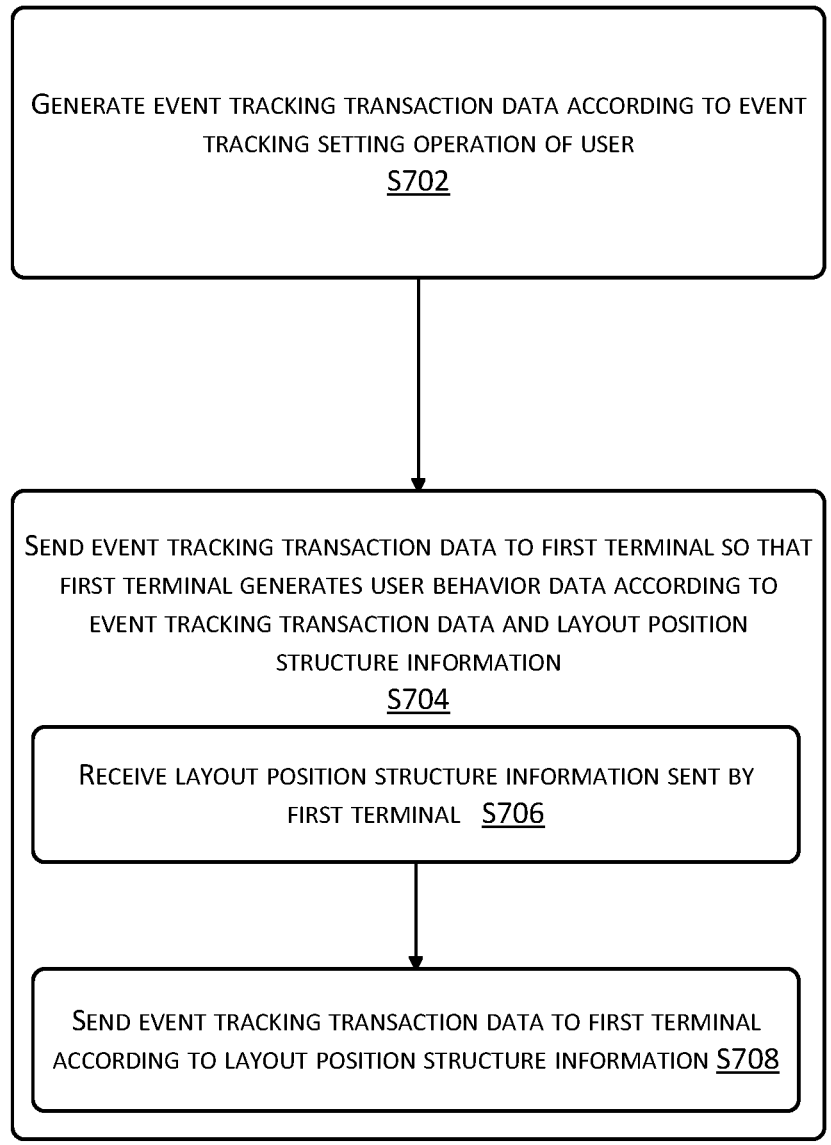
FIG. 7 is a flowchart illustrating a method for collecting data at a first server according to an aspect of the present disclosure.

FIG. 7 is a flowchart illustrating a method for collecting data at a first server according to an aspect of the present disclosure.

S702, the event tracking transaction data is generated according to the event tracking setting operation of the user.

S704, the event tracking transaction data is sent to the first terminal so that the first terminal generates the user behavior data according to the event tracking transaction data and the layout position structure information.

The first terminal is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to the second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data.

For example, the administrator uses the first server to conduct event tracking setting operation and generate the event tracking transaction data. The first server sends the event tracking transaction data to the first terminal. The first terminal calculates the layout position structure information, and then generates the user behavior data according to the event tracking transaction data and the layout position structure information and sends the user behavior data to the second server.

For example, the event tracking setting operation may be targeted to at least one of the following: an application, an application layout, an application page, and a page control.

For example, the event tracking transaction data is generated according to the event tracking setting operation of the administrator under the event tracking management system of the first server. The format of the event tracking transaction data is key-value data pair in json format. The setting of the event tracking via the network administrator controls the event tracking and avoids collecting too large quantity of data. The network administrator may use the application, the application layout, the application page, the page control as the dimension in the event tracking management system to set various levels of event tracking. The event tracking setting timing may be at the development stage, testing stage, or when the App is officially published to couple with the development of the App. The event tracking setting operation may be a registration or management operation at the application, the application layout, the application page, and the page control, such as adding, deleting, modifying, and searching operation. The event tracking transaction data may be set at the cache of the first server. The first terminal 100 obtains the event tracking transaction data from the cache of the first server. It reduces the calculation pressure that the App directly visits the event tracking managing system at the back end by saving to the cache.

For example, at S704, the event tracking transaction data is sent to the first terminal, which includes:

S706, the layout position structure information sent by the first terminal is received.

S708, the event tracking transaction data is sent to the first terminal according to the layout position structure information.

When the user clicks the control, the first terminal automatically calculates the layout position structure information of the control. The first server receives the layout position structure information sent by the first terminal. The first search matches according to the layout position structure information. For example, through the matching from the hash value of the layout position structure information to the event tracking transaction data in json format, the corresponding event tracking transaction data is obtained and sent to the first terminal.

Figure 8:
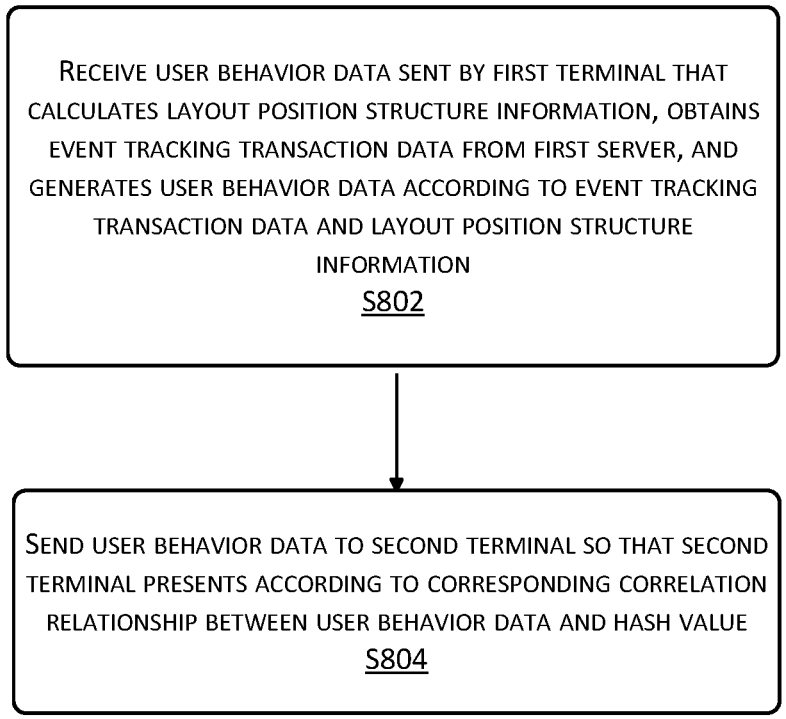
FIG. 8 is a flowchart illustrating a method for collecting data at a second server according to an aspect of the present disclosure.

FIG. 8 is a flowchart illustrating a method for collecting data at a second server according to an aspect of the present disclosure. The method for collecting data at the second server includes:

S802, the user behavior data sent by the first terminal is received. The first terminal calculates the layout position structure information. The first terminal obtains the event tracking transaction data from the first server. The first terminal generates the user behavior data according to the event tracking transaction data and the layout position structure information.

For example, the method for collecting data at the server may further include:

S804, the user behavior data is sent to the second terminal so that the second terminal presents according to a corresponding correlation relationship between the user behavior data and the hash value.

The first terminal is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to the second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data.

For example, the first terminal calculates the layout position structure information. The first terminal obtains the event tracking transaction data from the first server. The first terminal generates the user behavior data according to the event tracking transaction data and the layout position structure information. The first terminal sends the user behavior data to the second server. When the second terminal requests the user behavior data, the second server sends the user behavior data to the second terminal. The second terminal calculates to obtain the layout position structure information and calculates to obtain the hash value according to the layout position structure information. The second terminal presents the user behavior according to the corresponding correlation relationship between the user behavior data and the hash value.

Figure 9:
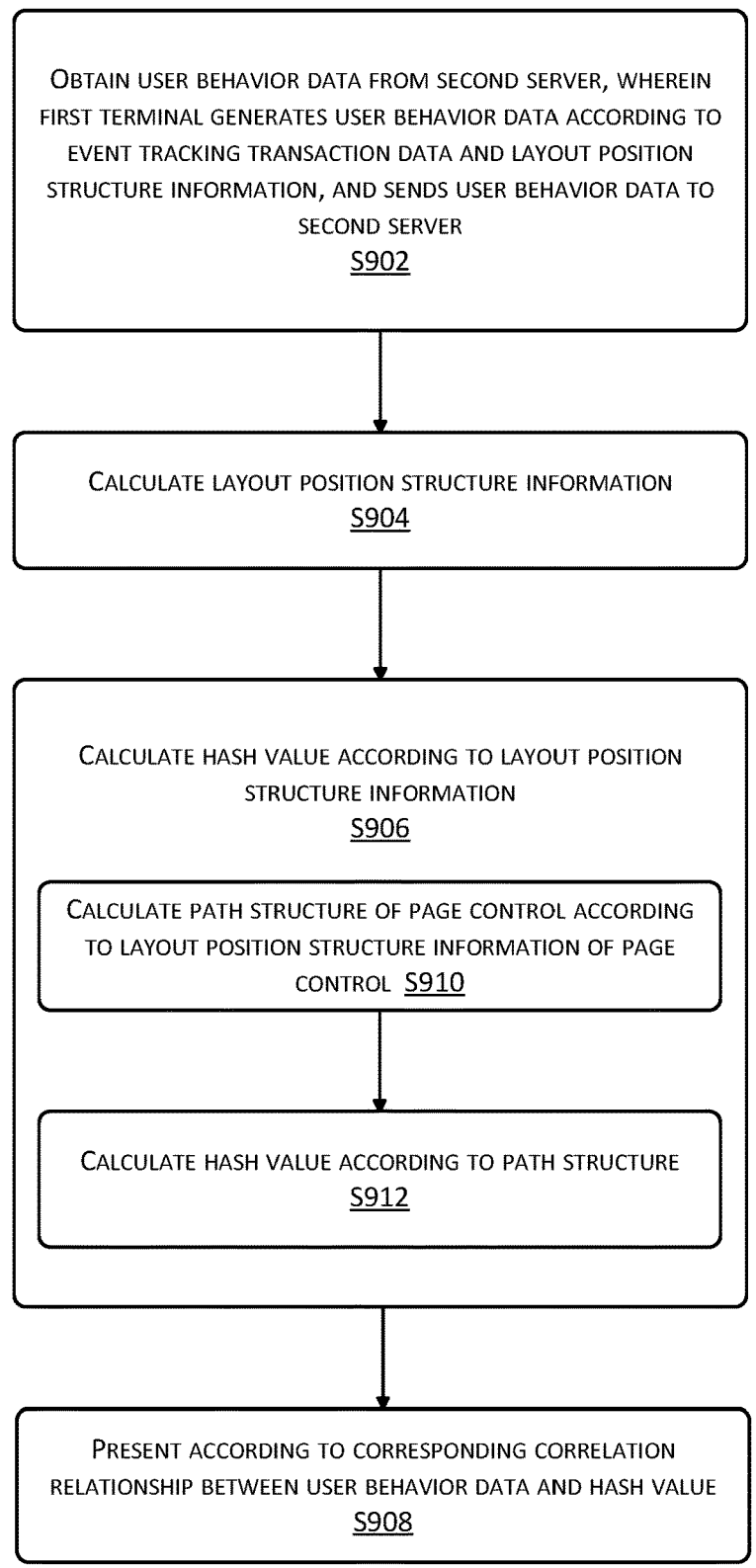
FIG. 9 is a flowchart illustrating a method for collecting data at a second terminal according to an aspect of the present disclosure.

FIG. 9 is a flowchart illustrating a method for collecting data at the second terminal according to an aspect of the present disclosure. The method for collecting data at the second terminal includes:

S902, the user behavior data is obtained from the second server. The first terminal generates the user behavior data according to the event tracking transaction data and the layout position structure information. The first terminal sends the user behavior data to the second server.

S904, the layout position structure information is calculated.

S906, the hash value is calculated according to the layout position structure information.

S908, the presentation is conducted according to the corresponding correlation relationship between the user behavior data and the hash value.

The first terminal is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to a second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data. The layout position structure information is a path structure of a page component such as xPath in XML path language. For example, an example path of Android system is /TestActivity/FrameLayout/linearLayout/ linearLayout/Button/id-buybutton.

For example, the first terminal calculates the layout position structure information. The first terminal obtains the event tracking transaction data from the first server. The first terminal generates the user behavior data according to the event tracking transaction data and the layout position structure information. The first terminal sends the user behavior data to the second server. When the second terminal requests the user behavior data, the second server sends the user behavior data to the second terminal. The second terminal calculates to obtain the layout position structure information and calculates to obtain the hash value according to the layout position structure information. The second terminal presents the user behavior according to the corresponding correlation relationship between the user behavior data and the hash value.

For example, at S902, the user behavior data is obtained from the second server, which includes that, before the cycle of the loaded application page ends, the user behavior log is requested from the second server to obtain the user behavior data.

For example, at S904, the layout position structure information is calculated, which includes that all of the page controls of the application page are traversed and the layout position structure information of each page control is calculated.

For example, at S906, the hash value is calculated according to the layout position structure information, which includes:

S910, the path structure of the page control is calculated according to the layout position structure information of the page control.

S912, the hash value is calculated according to the path structure.

For example, the second terminal switches to data visualization mode through SDK. Under the data visualization mode, the second terminal, in addition to displaying normal App function, displays a quantity of times that the control is clicked in one day through the UI control. After the second terminal obtains the user behavior data, the second terminal calculates the layout position structure information of the page of the first terminal. The second terminal calculates the hash value according to the layout position structure information. The second terminal calls the drawing API of Android for presentation according to the corresponding correlation relationship between the user behavior data and the hash value.

Under the conventional techniques, the server for collecting, after collecting the user behavior data, through the back-end statistics and analysis, presents in the form of table or visual form. However, it is intuitive to present the user behavior data in the form of table. After the second server collects the user behavior data of the first terminal, the second terminal requests the user behavior data of the first terminal stored at the second server, and presents the user behavior of the first terminal at the second terminal, which is more intuitive compared with the chart or table under the conventional techniques.

Figure 10:
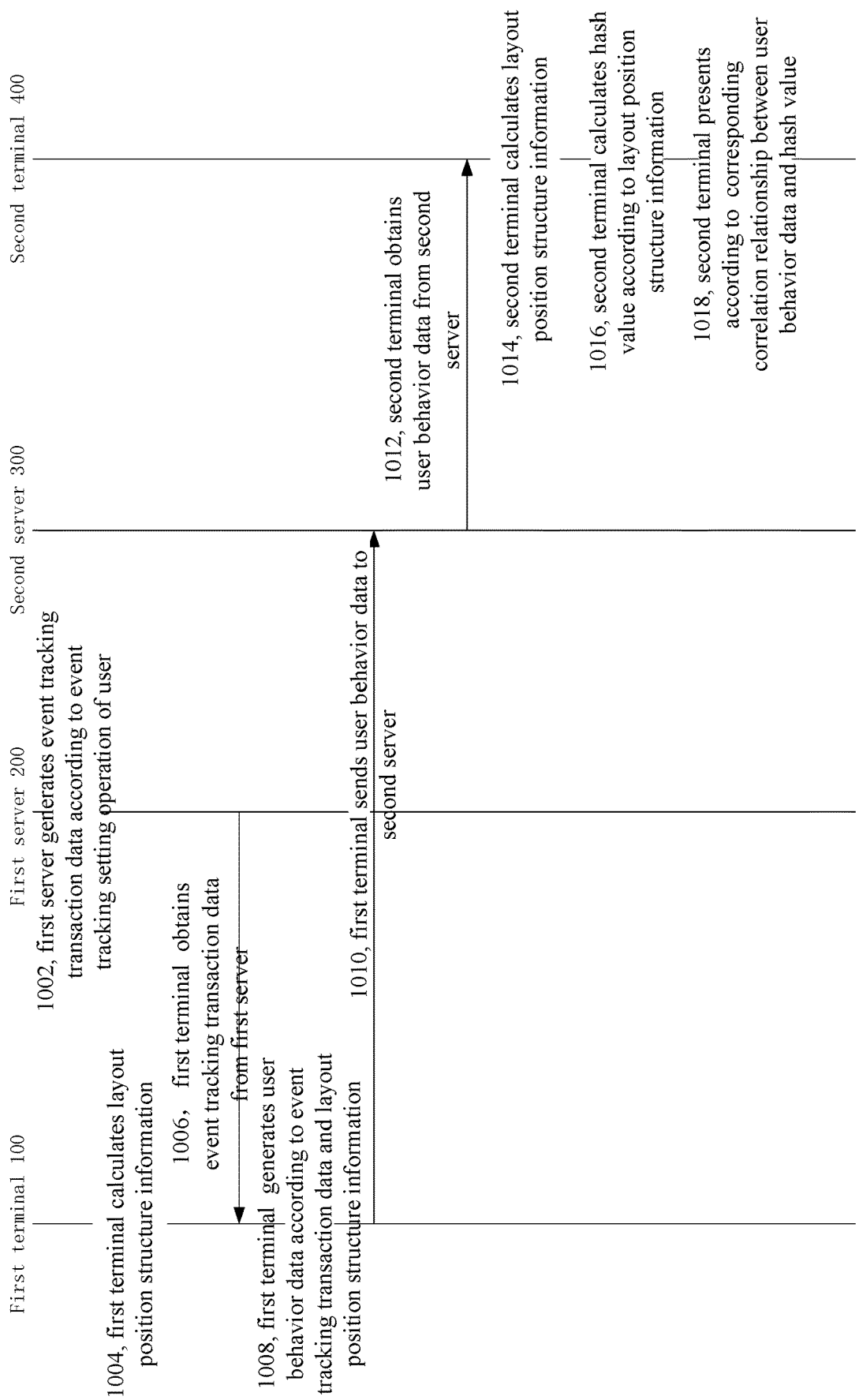
FIG. 10 is a flowchart illustrating a method for collecting data according to an aspect of the present disclosure.

FIG. 10 is a flowchart illustrating a method for collecting data according to an aspect of the present disclosure. The method for collecting data includes:

S1002, the first server 200 generates the event tracking transaction data according to the event tracking setting operation of the user.

S1004, the first terminal 100 calculates the layout position structure information.

S1006, the first terminal 100 obtains the event tracking transaction data from the first server 200.

S1008, the first terminal 100 generates the user behavior data according to the event tracking transaction data and the layout position structure information.

S1010, the first terminal 100 sends the user behavior data to the second server 300.

S1012, the second terminal 400 obtains the user behavior data from the second server 300.

S1014, the second terminal 400 calculates the layout position structure information.

S1016, the second terminal 400 calculates the hash value according to the layout position structure information.

S1018, the second terminal 400 presents according to the corresponding correlation relationship between the user behavior data and the hash value.

The first terminal is the terminal for collecting the user behavior data, i.e., the source of the user behavior data. After collecting the user behavior data, the first terminal 100 sends the user behavior data to a second server. The second server is a cloud server that stores the collected user behavior data into the cloud for further statistics and analysis based on the user behavior data. For example, the second server sends the user behavior data to a second terminal so that the second terminal presents according to a corresponding correlation relationship between the user behavior data and the hash value. The second terminal is a terminal for presentation. The second terminal obtains the user behavior data from the second server and presents the user behavior according to the user behavior data. The first server includes an event tracking management system. The first terminal obtains the event tracking transaction data from the first server to collect the user behavior data based on the event tracking location set by the administrator, thereby implementing automatic event tracking at the first terminal and improving the accuracy of event tracking. The first server and the second server may be deployed separately to reduce the calculation pressure on the server when collecting the user behavior data. The layout position structure information is a path structure of a page component such as xPath in XML path language. For example, an example path of Android system is /TestActivity/FrameLayout/linearLayout/ linearLayout/Button/id-buybutton.

For example, at S1006, the first terminal 100 obtains the event tracking transaction data from the first server, which includes:

The first terminal 100 obtains the event tracking transaction data from the first server according to the layout position structure information.

When the user clicks the control, the first terminal automatically calculates the hash value of the path structure to the control, converts the hash value to the data in json format to search for the corresponding event tracking transaction data from the first server.

For example, at S1008, the first terminal 100 generates the user behavior data according to the event tracking transaction data and the layout position structure information, which includes:

The first terminal 100 generates the user behavior data according to the event tracking transaction data, the layout position structure information, and additional information. The additional information includes at least one of the following: a device name, a device model number, and a resolution.

The additional information includes at least one of the following: a device name, a device model number, and a resolution. The additional information may be obtained by calling the API of the operation system of the terminal. The first terminal collects the additional information and adds such information into the user behavior data, which improves the completeness of the user behavior data.

For example, at S1012, the second terminal 400 obtains the user behavior data from the second server, which includes:

Before the cycle of the loaded application page ends, the second terminal 400 requests the user behavior log from the second server to obtain the user behavior data.

For example, at S1014, the second terminal 400 calculates the layout position structure information, which includes:

The second terminal 400 traverses all of the page controls of the application page, and calculates the layout position structure information of each page control.

For example, at S1016, the second terminal 400 calculates the hash value according to the layout position structure information, which includes:

The second terminal 400 obtains the path structure of the page control according to the layout position structure information of the page control. The second terminal 400 calculates the hash value according to the path structure.

The present disclosure provides a method for collecting data at a terminal, the method comprising:
  calculating layout position structure information;
  obtaining event tracking transaction data from a first server;
  generating user behavior data according to the event tracking transaction data and the layout position structure information; and
  sending the user behavior data to a second server.

For example, the method may further comprise:
  generating the event tracking transaction data according to an event tracking setting operation of a user,
  wherein the event tracking setting operation is targeted to at least one of the following:
  an application;
  an application layout;
  an application page; and
  a page control.

For example, the obtaining the event tracking transaction data from the first server includes:
  obtaining the event tracking transaction data from the first server according to the layout position structure information.

For example, the generating the user behavior data according to the event tracking transaction data and the layout position structure information includes:
  generating the user behavior data according to the event tracking transaction data, the layout position structure information, and additional information.

For example, the additional information includes at least one of the following:
  a device name;
  a device model number; and
  a resolution.

The present disclosure also provides a method for collecting data at a server, the method comprising:
  generating event tracking transaction data according to an event tracking setting operation of a user; and
  sending the event tracking transaction data to a first terminal so that the first terminal generates user behavior data according to the event tracking transaction data and layout position structure information.

For example, the event tracking setting operation is targeted to at least one of the following:
  an application;
  an application layout;
  an application page; and
  a page control.

For example, the sending the event tracking transaction data to the first terminal includes:

receiving the layout position structure information sent by the first terminal; and sending the event tracking transaction data to the first terminal according to the layout position structure information.

The present disclosure also provides a method for collecting at a server, the method comprising:

receiving user behavior data sent by a first terminal, wherein the first terminal calculates layout position structure information, obtains event tracking transaction data from a first server, and generates the user behavior data according to the event tracking transaction data and the layout position structure information.

For example, the method may further comprise sending the user behavior data to a second terminal so that the second terminal presents according to a corresponding correlation relationship between the user behavior data and a hash value.

The present disclosure also provides a method for collecting data at a terminal, the method comprising:

obtaining user behavior data from a second server, wherein a first terminal generates the user behavior data according to event tracking transaction data and layout position structure information, and sends the user behavior data to the second server;

calculating layout position structure information;

calculating a hash value according to the layout position structure information; and presenting according to a corresponding correlation relationship between the user behavior data and the hash value.

For example, the obtaining the user behavior data from the second server includes:

before a cycle of a loaded application page ends, requesting a user behavior log from the second server to obtain the user behavior data.

For example, the calculating the layout position structure information includes:

traversing all of page controls of an application page; and calculating the layout position structure information of each page control.

For example, the calculating the hash value according to the layout position structure information includes:

obtaining a path structure of a page control according to the layout position structure information of the page control; and calculating the hash value according to the path structure.

The present disclosure also provides a terminal for collecting data, the terminal comprising:

an eleventh unit that calculates layout position structure information;

a twelfth unit that obtains event tracking transaction data from a first server;

a thirteenth unit that generates user behavior data according to the event tracking transaction data and the layout position structure information; and a fourteenth unit that sends the user behavior data to a second server.

For example, the event tracking transaction data is generated according to an event tracking setting operation of a user; and the event tracking setting operation is targeted to at least one of the following:

an application;
an application layout;
an application page; and
a page control.

For example, the twelfth unit further obtains the event tracking transaction data from the first server according to the layout position structure information.

For example, wherein the thirteenth unit further generates the user behavior data according to the event tracking transaction data, the layout position structure information, and additional information.

For example, the additional information includes at least one of the following:

a device name;
a device model number; and
a resolution.

The present disclosure also provides a server for collecting data, the server comprising:

a twenty-first unit that generates event tracking transaction data according to an event tracking setting operation of a user; and a twenty-second unit that sends the event tracking transaction data to a first terminal so that the first terminal generates user behavior data according to the event tracking transaction data and layout position structure information.

For example the event tracking setting operation is targeted to at least one of the following:

an application;
an application layout;
an application page; and
a page control.

For example, the twenty-second unit further includes:

a two hundred twenty-first sub-unit that receives the layout position structure information sent by the first terminal; and a two hundred twenty-second sub-unit that sends the event tracking transaction data to the first terminal according to the layout position structure information.

The present disclosure also provides a server for collecting, the server comprising:

a thirty-first unit that receives user behavior data sent by a first terminal, wherein the first terminal calculates layout position structure information, obtains event tracking transaction data from a first server, and generates the user behavior data according to the event tracking transaction data and the layout position structure information.

For example, the server may further comprise a thirty-second unit that sends the user behavior data to a second terminal so that the second terminal presents according to a corresponding correlation relationship between the user behavior data and a hash value.

The present disclosure also provides a terminal for collecting data at a terminal, the terminal comprising:

a forty-first unit that obtains user behavior data from a second server, wherein a first terminal generates the user behavior data according to event tracking transaction data and layout position structure information, and sends the user behavior data to the second server;

a forty-second unit that calculates layout position structure information;

a forty-third unit that calculates a hash value according to the layout position structure information; and a forty-fourth unit that presents according to a corresponding correlation relationship between the user behavior data and the hash value.

For example, the forty-first unit further, before a cycle of a loaded application page ends, requests a user behavior log from the second server to obtain the user behavior data.

For example, the forty-second unit further:

traverses all of page controls of an application page; and calculates the layout position structure information of each page control.

For example, the forty-third unit includes:

a four hundred thirty-first unit that obtains a path structure of a page control according to the layout position structure information of the page control; and a four hundred thirty-second unit that calculates the hash value according to the path structure.

It will be apparent to those skilled in the art that the present disclosure is not limited to the details of the above-described example embodiments and that the present disclosure may be realized in other specific forms without departing from the spirit or essential characteristics of the present disclosure. Accordingly, the example embodiments herein are to be considered as illustrative and not restrictive, and the scope of the present disclosure is defined by the appended claims rather than by the foregoing description. It is therefore intended that all changes that come within the meaning and range of equivalents to the claims are intended to be embraced within the scope of the present disclosure. Any reference signs in the claims should not be construed as limiting the claimed claims. In addition, it is clear that the term "including" does not exclude other elements or steps, and the singular does not exclude the plural. The plurality of units or devices described in the device claims may also be implemented by one unit or device through software or hardware. The terms, first, second, etc., are used to express the names, and do not represent any particular order.

The invention claimed is:

1. A method for improving an accuracy of event tracking, comprising:

calculating, by a client terminal, layout position structure information of a page, the layout position structure information including a path structure of a page control;

obtaining, by the client terminal, event tracking transaction data from a first server according to the layout position structure information;

generating, by the client terminal, user behavior data according to the event tracking transaction data and the layout position structure information; and calculating, by the client terminal, a hash value according to the layout position structure information.

2. The method of claim 1, further comprising:
sending the user behavior data to a second server.

3. The method of claim 1, further comprising:
generating the event tracking transaction data according to an event tracking setting operation of a user.

4. The method of claim 3, wherein the event tracking setting operation is targeted to at least one of the following:
an application;
an application layout;
an application page; and
the page control.

5. The method of claim 1, wherein the generating the user behavior data according to the event tracking transaction data and the layout position structure information includes:
generating the user behavior data according to the event tracking transaction data, the layout position structure information, and additional information.

6. The method of claim 5, wherein the additional information includes at least one of the following:
a device name;
a device model number; and
a resolution.

7. A server comprising:
one or more processors; and
one or more memories storing thereon computer-readable instructions that, when executed by the one or more processors, cause the one or more processors to perform acts for improving an accuracy of event tracking, the acts comprising:
generating, by the server, event tracking transaction data according to an event tracking setting operation of a user; and
sending, by the server, the event tracking transaction data to a first terminal to generate user behavior data according to the event tracking transaction data and layout position structure information of a page, the layout position structure information including a path structure of a page control, wherein the first terminal calculates a hash value according to the layout position structure information.

8. The server of claim 7, wherein the event tracking setting operation is targeted to at least one of the following:
an application;
an application layout;
an application page; and
the page control.

9. The server of claim 7, wherein the sending by the server the event tracking transaction data to the first terminal includes:
receiving the layout position structure information sent by the first terminal; and
sending the event tracking transaction data to the first terminal according to the layout position structure information.

10. One or more memories storing thereon computer-readable instructions that, when executed by one or more processors, cause the one or more processors to perform acts for improving an accuracy of event tracking, the acts comprising:
obtaining, by a client terminal, user behavior data from a second server;
calculating, by the client terminal, layout position structure information of the page, the layout position structure information including a path structure of a page control; and
calculating, by the client terminal, a hash value according to the layout position structure information.

11. The one or more memories of claim 10, wherein the acts further comprise:
presenting a user behavior according to a corresponding correlation relationship between the user behavior data and the hash value.

12. The one or more memories of claim 10, wherein a first terminal generates the user behavior data according to event tracking transaction data and layout position structure information, and sends the user behavior data to the second server.

13. The one or more memories of claim 12, wherein the event tracking transaction data is generated according to an event tracking setting operation of a user.

14. The one or more memories of claim 13, wherein the event tracking setting operation is targeted to at least one of the following:
an application;
an application layout;
an application page; and
the page control.

15. The one or more memories of claim 10, wherein the obtaining by the client terminal the user behavior data from the second server includes:

before a cycle of a loaded application page ends, requesting a user behavior log from the second server to obtain the user behavior data.

16. The one or more memories of claim 10, wherein the calculating by the client terminal the layout position structure information includes:

traversing all of page controls of an application page; and
calculating the layout position structure information of each page control.

17. The one or more memories of claim 16, wherein the calculating the hash value according to the layout position structure information further includes:

calculating the hash value according to the path structure.

\* \* \* \* \*